US011796554B2

(12) United States Patent
Tian et al.

(10) Patent No.: US 11,796,554 B2
(45) Date of Patent: Oct. 24, 2023

(54) INTEGRATED ACCELERATION, SPEED AND VIBRATION SENSOR

(71) Applicants: China Oil & Gas Pipeline Network Corporation, Beijing (CN); South China Company, China Oil & Gas Pipeline Network Corporation, Guangzhou (CN)

(72) Inventors: Zhongshan Tian, Beijing (CN); Xianzhong Wang, Guangzhou (CN); Lin Yi, Guangzhou (CN); Changqun Yang, Guangzhou (CN); Daodong Niu, Guangzhou (CN); Jiaming Liang, Guangzhou (CN)

(73) Assignees: China Oil & Gas Pipeline Network Corporation, Beijing (CN); South China Company, China Oil & Gas Pipeline Network Corporation, Guangzhou (CN)

(*) Notice: Subject to any disclaimer, the term of this patent is extended or adjusted under 35 U.S.C. 154(b) by 0 days.

(21) Appl. No.: 17/705,459

(22) Filed: Mar. 28, 2022

(65) Prior Publication Data
US 2022/0229082 A1    Jul. 21, 2022

(30) Foreign Application Priority Data
Sep. 9, 2021   (CN) .......................... 2021110562556

(51) Int. Cl.
*G01P 1/04*    (2006.01)
*G01P 1/02*    (2006.01)
*H01C 7/12*    (2006.01)

(52) U.S. Cl.
CPC ................ *G01P 1/04* (2013.01); *G01P 1/023* (2013.01); *G01P 1/026* (2013.01); *H01C 7/12* (2013.01)

(58) Field of Classification Search
CPC ............ G01P 1/01; G01P 1/023; G01P 1/026
See application file for complete search history.

(56) References Cited

FOREIGN PATENT DOCUMENTS

| CN | 101819060 A | | 9/2010 | |
| CN | 107703330 A | * | 2/2018 | ............ G01P 15/125 |
| CN | 112197854 A | | 1/2021 | |

OTHER PUBLICATIONS

Machine translation of CN207703894U (Year: 2018).*

* cited by examiner

Primary Examiner — Walter L Lindsay, Jr.
Assistant Examiner — Andrew V Do
(74) Attorney, Agent, or Firm — IPro, PLLC

(57) ABSTRACT

Disclosed is an integrated acceleration, speed and vibration sensor. The sensor includes a housing, a base, a sensing and signal processing circuit, a current loop circuit, an anti-surge PTC and an aviation plug. The housing is mounted on the base. The sensing and signal processing circuit and the current loop circuit are used to fabricate a PCB circuit board, and then the PCB circuit board is mounted in the housing. A power supply and signal line is connected to the aviation plug. An M6 threaded hole is formed in a bottom of the housing of the sensor and is used to connect with an object to be detected. A power supply is negatively connected to one end of a varistor and the other end of the varistor is connected to the housing as the anti-surge PTC to play a protective role. The M6 threaded hole formed in the bottom of the housing of the sensor is used to connect with the object to be detected and improve the stability. At the same time, after the PCB circuit board is mounted, adhesive filling is performed to improve the vibration resistance.

5 Claims, 7 Drawing Sheets

INTEGRATED ACCELERATION, SPEED AND VIBRATION SENSOR

TECHNICAL FIELD

The disclosure relates to the technical field of sensing, and in particular to an integrated acceleration, speed and vibration sensor.

BACKGROUND

A piezoelectric vibration sensor is a sensor based on piezoelectric effect, and its sensing element is made of a piezoelectric material. Due to the piezoelectric effect, the piezoelectric material will generate charges on its surface under the action of pressure. The advantages of the piezoelectric vibration sensor mainly include high sensitivity, wide range of frequency response, high reliability and the like. The piezoelectric vibration sensor is mainly used to monitor vibration parameters and prevent mechanical faults and dangerous accidents.

Due to the particularity of the vibration sensor, it is usually in a severe working environment and in an all-weather service state, which puts forward very high requirements for the reliability of the vibration sensor. During the operation of industrial equipment, there are different degrees of vibration. Serious vibration will reduce the efficiency of the equipment and the accuracy of an actuator, destroy the operating state of the machine, and even shorten the service life of the equipment. Therefore, higher requirements are put forward for the reliability and sensitivity of the vibration sensor.

At present, the most commonly used vibration sensor is the piezoelectric vibration sensor, and its sensing element is the core component of the piezoelectric vibration sensor, which directly determines the sensitivity of the sensor. The structure of the sensing element includes a compression type and a shear type, and each has its own characteristics.

A compression type piezoelectric vibration sensor is simple and the cost is relatively low. However, in the structure of the compression type vibration sensor, a piezoelectric ceramic sheet is connected with a sensor housing, so that charges generated by the piezoelectric ceramic sheet due to vibration will be directly transmitted to the sensor housing. Generally, the housing is made of a conductive metal such as stainless steel. Therefore, it will cause a sensor measurement error.

A piezoelectric ceramic sheet of a shear type piezoelectric vibration sensor is not connected with the sensor housing, and its charges will not be affected by the housing, so its noise interference is small. However, the largest piezoelectric coefficient of piezoelectric ceramics is d33 parameter. Using the shear type vibration sensor will have the problem of low sensitivity, the structure of the shear type vibration sensor is complex and the price is too high. For the shear type piezoelectric vibration sensor, the core piezoelectric sensing component is generally fastened by means of a bolt passing through the center of the piezoelectric sensing component and fitting with a nut, or by means of conductive adhesive bonding. The fastening method makes the assembly process cumbersome and the process stability low, resulting in low reliability in mass production of products. At the same time, due to the need to use the bolt, nut or conductive adhesive, the production cost is increased to a certain extent. In addition, when using conductive adhesive for fastening, the working temperature of the piezoelectric sensing component is limited due to the use of the conductive adhesive.

According to the above analysis, it can be seen that the piezoelectric vibration sensor has the problems of low sensitivity, low reliability, low stability and poor accuracy. Therefore, it is very necessary to design an integrated acceleration, speed and vibration sensor with high sensitivity, high precision and high reliability.

SUMMARY

In order to solve the above problem, the disclosure provides an integrated acceleration, speed and vibration sensor. The disclosure provides the following technical solution:

An integrated acceleration, speed and vibration sensor, wherein the sensor includes a housing, a base, a sensing and signal processing circuit, a current loop circuit, an anti-surge PTC and an aviation plug.

The housing is mounted on the base; the sensing and signal processing circuit and the current loop circuit are used to fabricate a PCB circuit board; then the PCB circuit board is mounted in the housing; a power supply and signal line is connected to the aviation plug; and an M6 threaded hole is formed in a bottom of the housing of the sensor and is used to connect with an object to be detected.

Preferably, the sensing and signal processing circuit adopts ADXL335 as a core, and an X-axis of a No. 12 pin corresponds to acceleration of vibration in a vertical direction, which is divided into two loops of signals.

Preferably, one loop of signal 3U2IN of the two loops of signals is amplified by an in-phase proportional amplifier circuit to directly output an acceleration voltage signal; the other loop of signal 3U1IN+ is converted into a current signal through an integrator circuit, then transmitted to an amplifier circuit, output to a low-pass filter circuit for DC filtering, transmitted to an RES-to-DC circuit, and finally transmitted to a 4-20 mA current output circuit through an amplifier circuit to output a speed current signal.

Preferably, a power supply is negatively connected to one end of a varistor and the other end of the varistor is connected to the housing as the anti-surge PTC to play a protective role.

The disclosure has the following beneficial effects:

The sensor provided by the disclosure has large bandwidth (10 Hz-1 kHz), high sensitivity (10.2 mV/m/s2±20%), good linearity (±1%), high stability and reliability, low power consumption, simple structure and low cost. It completely solves the problem existing in the piezoelectric vibration sensor at present, and an acceleration circuit with an ADXL335 accelerometer integrated chip as the core directly outputs an acceleration voltage signal. At the same time, through a first-order active low-pass filter, a voltage to 4-20 mA current output circuit with LTC1967 and XTR115 as the core outputs the speed current signal. The sensor has a current and voltage dual output function. The M6 threaded hole is formed in the bottom of the housing of the sensor and is used to connect with the object to be detected and improve the stability. At the same time, after the PCB circuit board is mounted, adhesive filling is performed to improve the vibration resistance.

DETAILED DESCRIPTION

The disclosure will be described in detail below in combination with specific examples.

Example 1

Referring to FIG. 1 to FIG. 10, the disclosure provides an integrated acceleration, speed and vibration sensor. The integrated acceleration, speed and vibration sensor includes a housing, a base, a sensing and signal processing circuit, a current loop circuit, an anti-surge PTC and an aviation plug.

The housing is mounted on the base; the sensing and signal processing circuit and the current loop circuit are used to fabricate a PCB circuit board; then the PCB circuit board is mounted in the housing; a power supply and signal line is connected to the aviation plug; and an M6 threaded hole is formed in a bottom of the housing of the sensor and is used to connect with an object to be detected. A power supply is negatively connected to one end of a varistor and the other end of the varistor is connected to the housing as the anti-surge PTC to play a protective role.

The sensing and signal processing circuit adopts ADXL335 as a core. ADXL335 is a small, thin, low-power and complete three-axis accelerometer, which provides signal conditioned voltage output and can measure acceleration in a minimum±3 g full-scale range. It can measure static gravity acceleration in tilt detection applications and dynamic acceleration caused by motion, impact or vibration.

Figure 1:
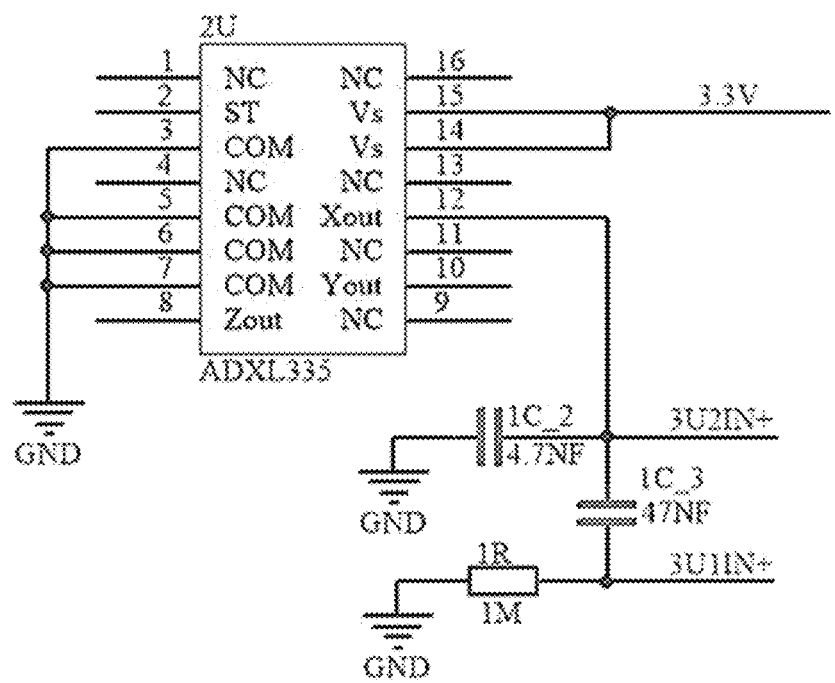
FIG. 1 is a structural diagram of an ADXL335 accelerometer integrated chip.
Figure 2:
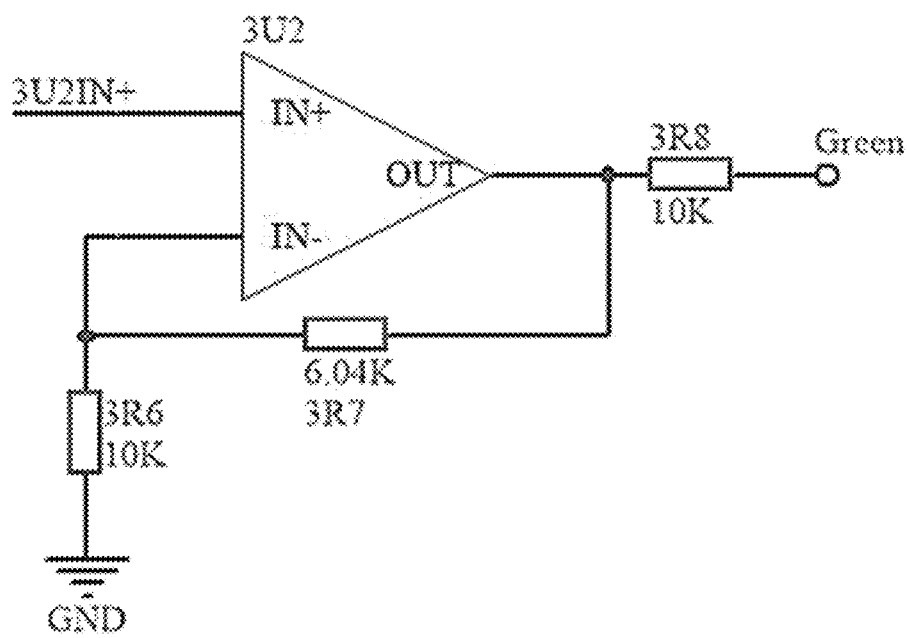
FIG. 2 is a diagram of an in-phase proportional amplifier circuit.
Figure 3:
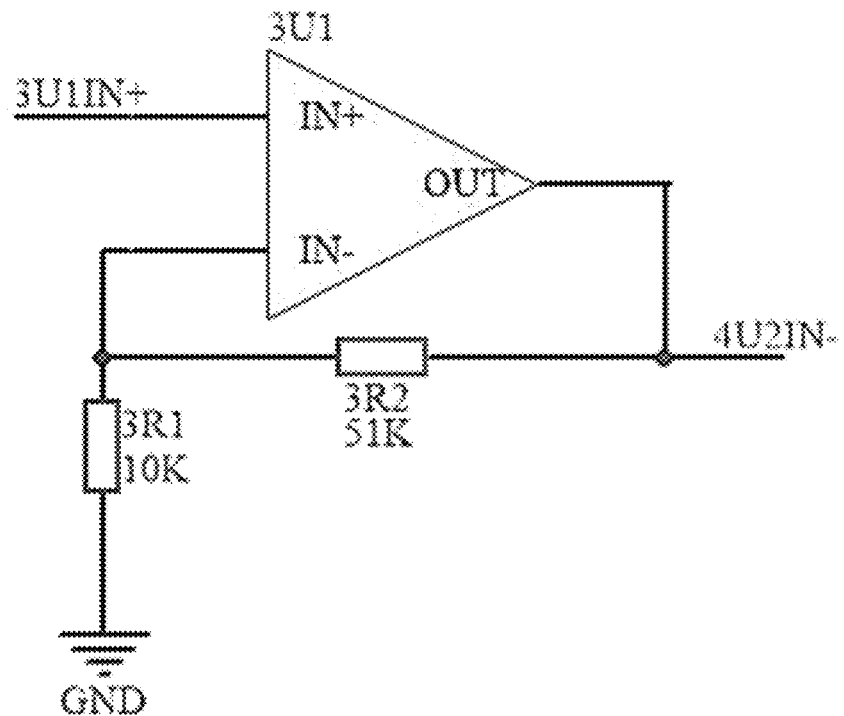
FIG. 3 is a diagram of an amplifier circuit.
Figure 4:
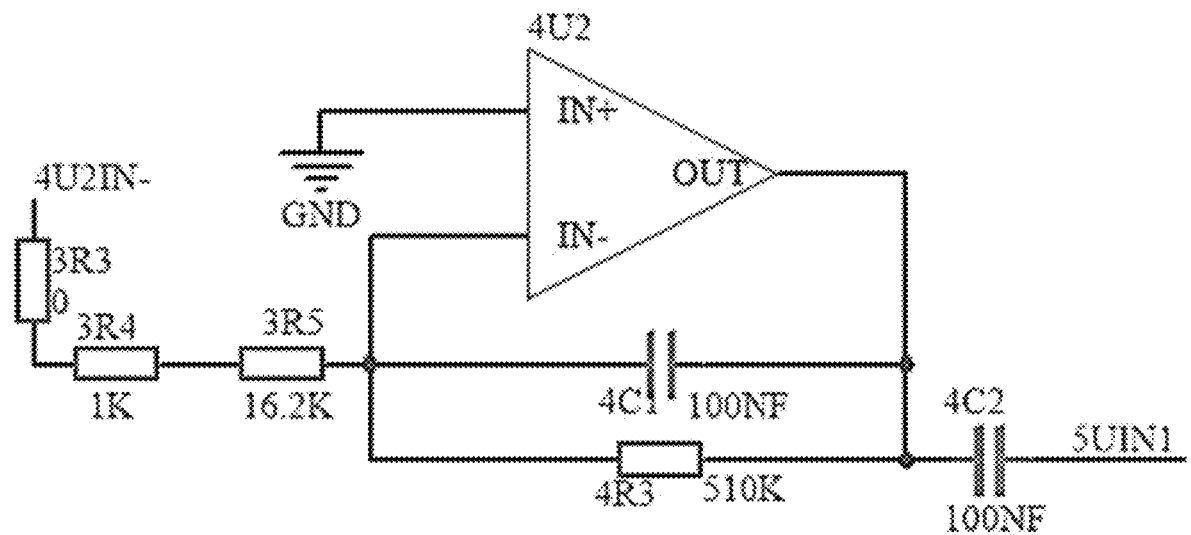
FIG. 4 is a diagram of a first-order active low-pass filter circuit.
Figure 5:
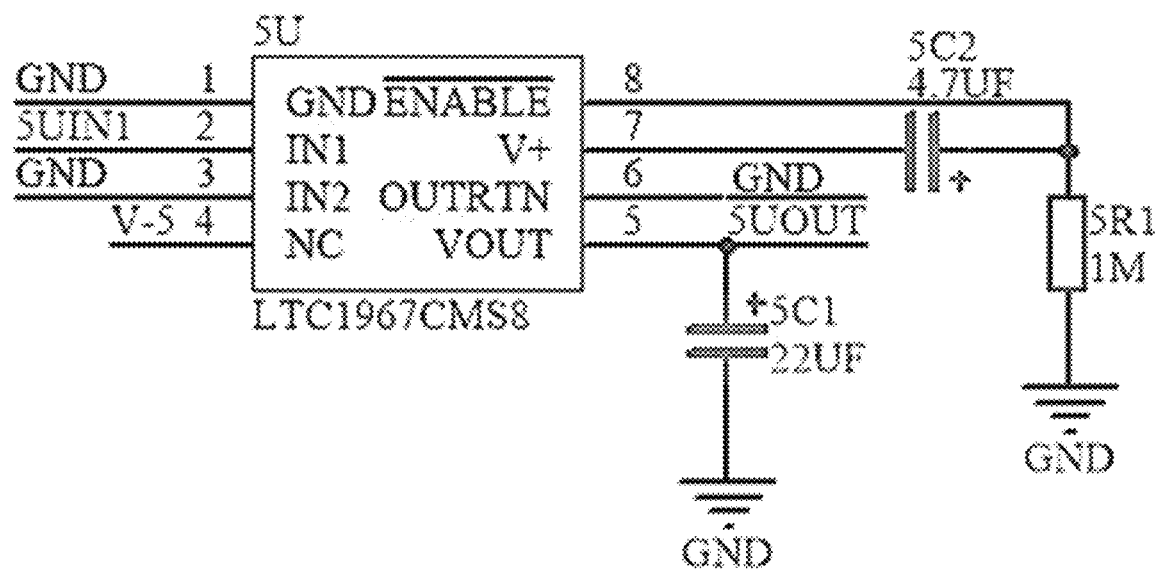
FIG. 5 is a diagram of an RES-to-DC circuit.
Figure 6:
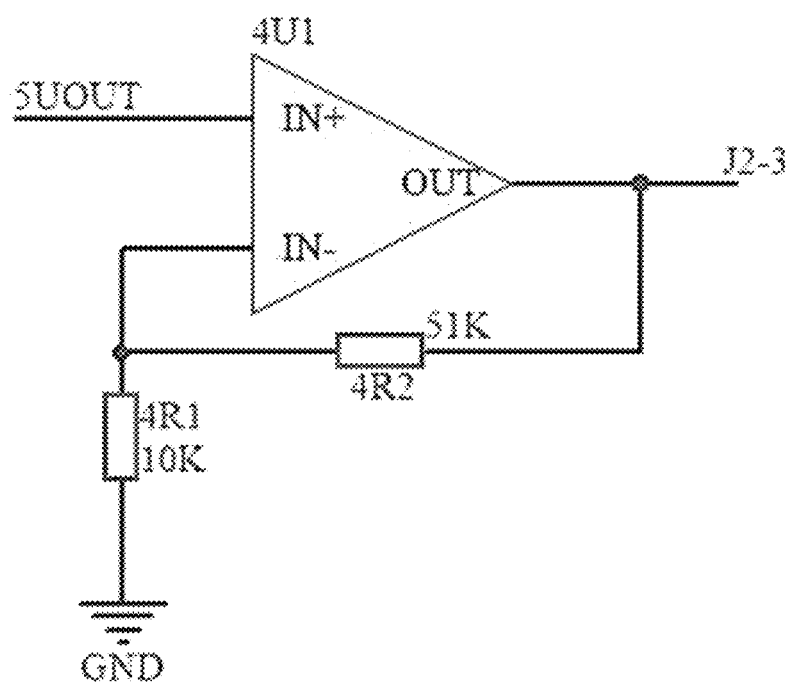
FIG. 6 is a diagram of an amplifier circuit.
Figure 7:
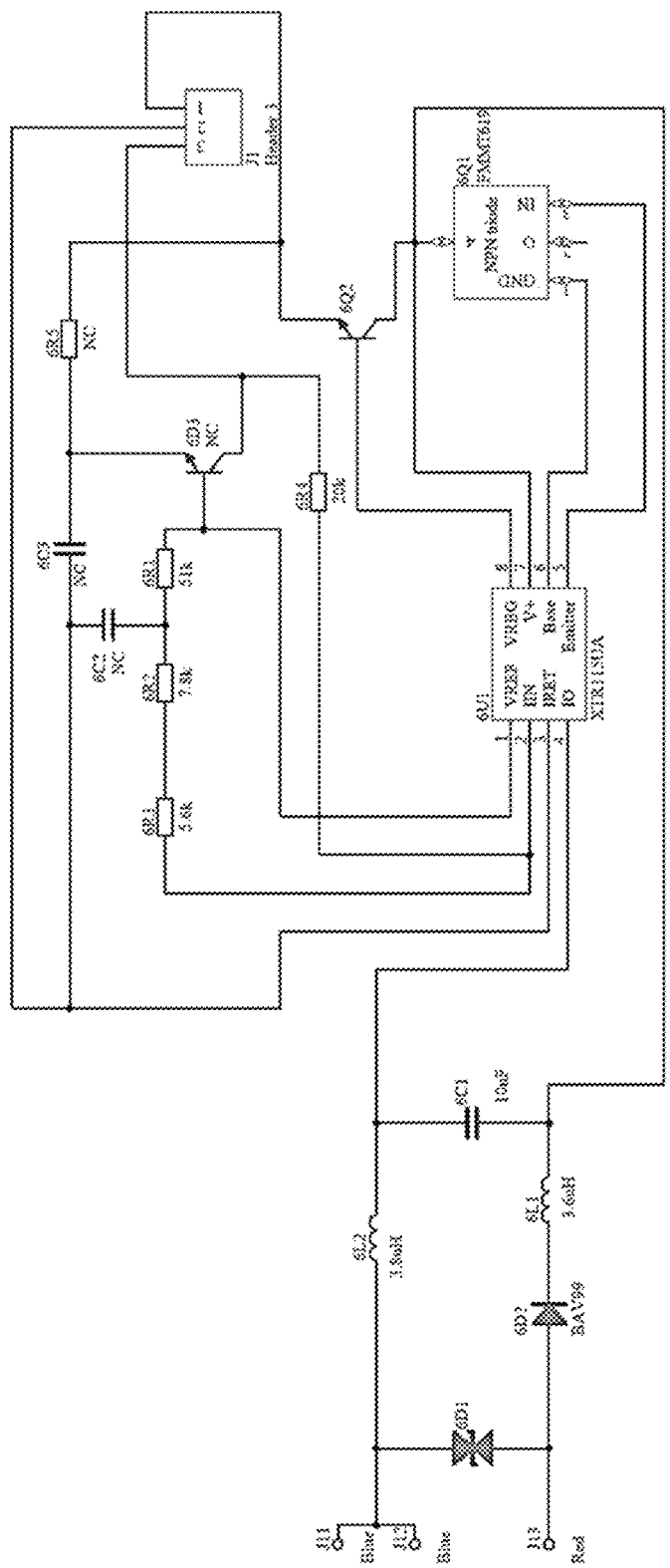
FIG. 7 is a diagram of a 4-20 mA current output circuit.
Figure 8:
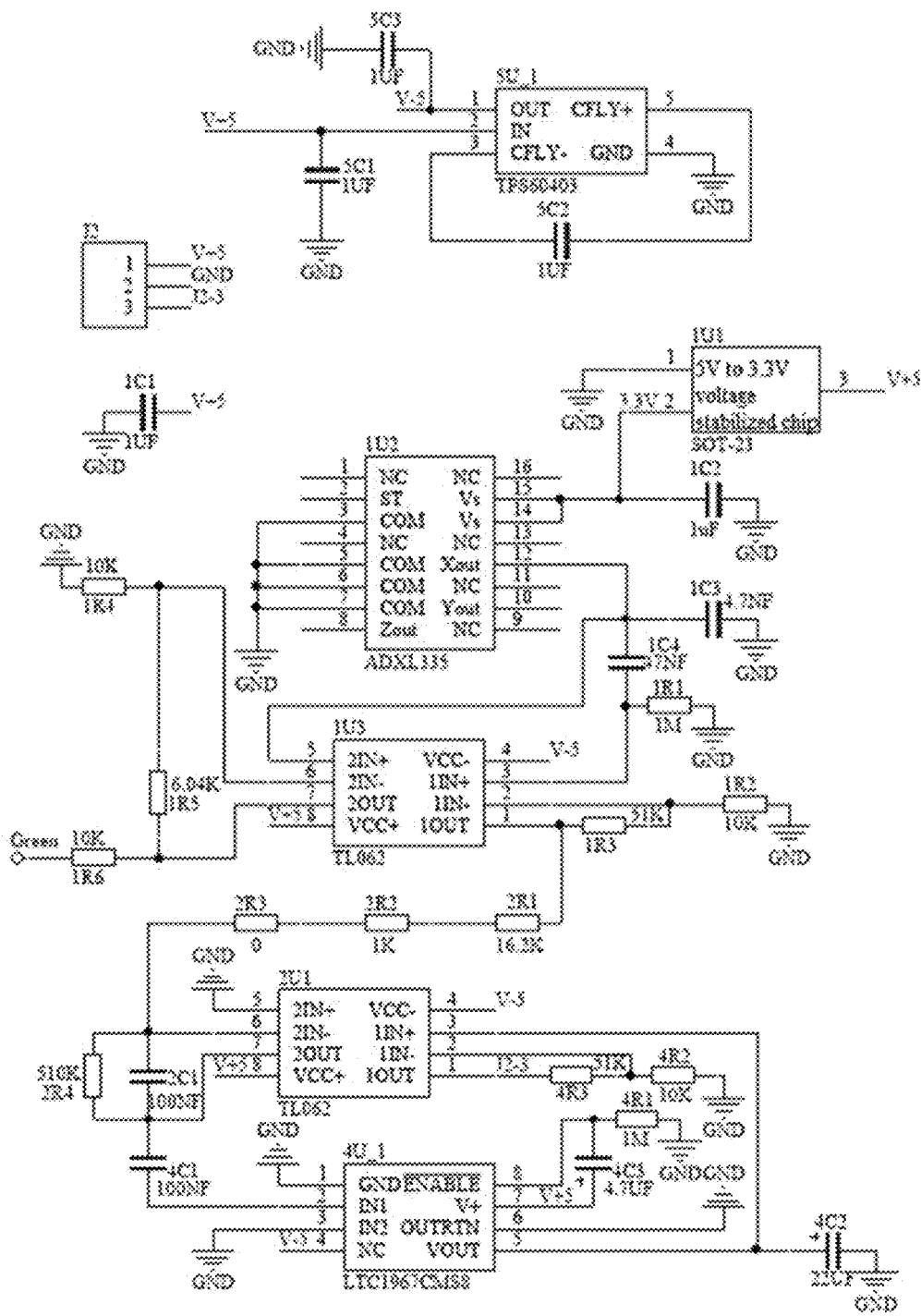
FIG. 8 is a diagram of a sensing and signal processing circuit.
Figure 9:
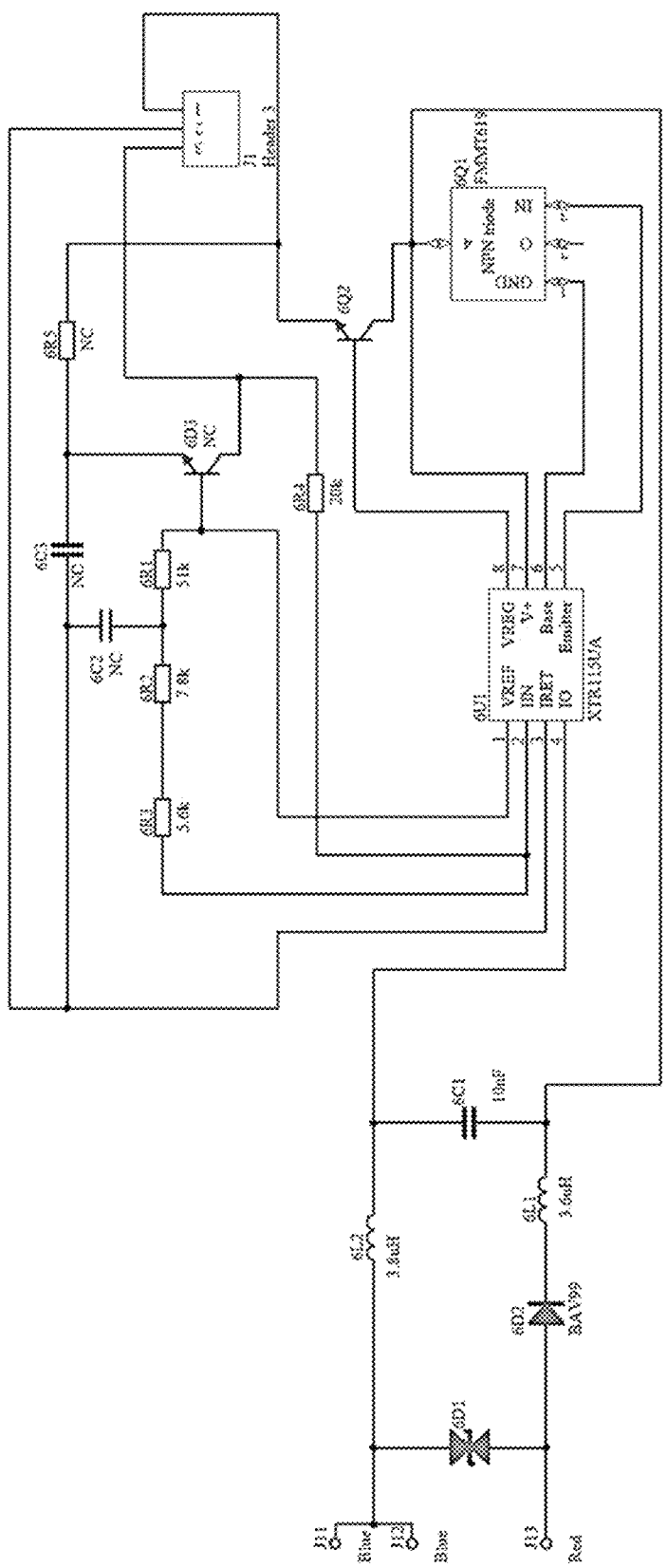
FIG. 9 is a diagram of a current loop circuit.
Figure 10:
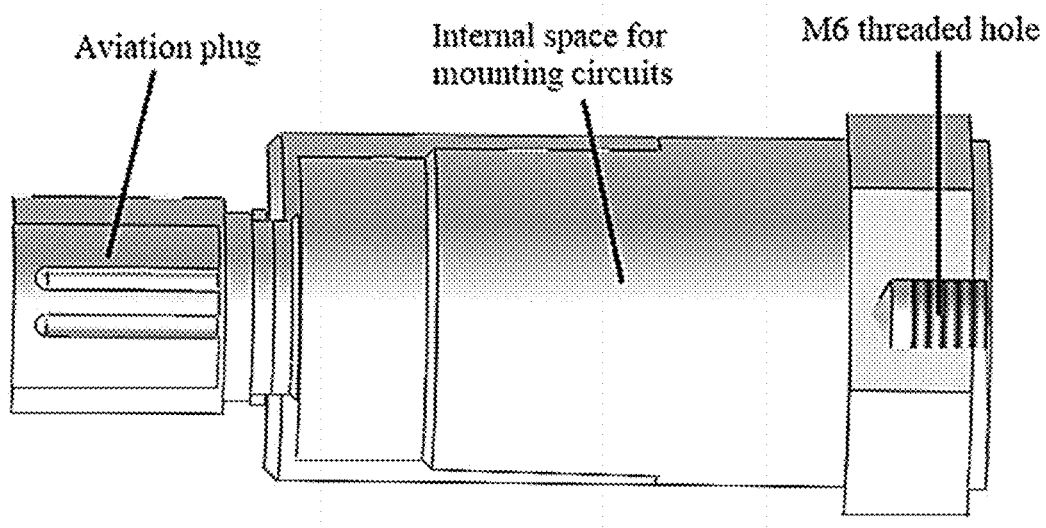
FIG. 10 is a cross-sectional view of a housing of a sensor.

The sensor takes an ADXL335 accelerometer integrated chip shown in FIG. 1 as the core. The X-axis acceleration of a No. 12 pin is output. The X-axis corresponds to acceleration of vibration of the sensor in a vertical direction, which is then divided into two loops of signals. One loop of signal (3U2IN+) is amplified by an in-phase proportional amplifier circuit shown in FIG. 2 to directly output an acceleration voltage signal; the other loop of signal (3U1IN+) is converted into a current signal through an integrator circuit, then transmitted to an amplifier circuit shown in FIG. 3, output to a low-pass filter circuit shown in FIG. 4 for DC filtering, transmitted to an RES-to-DC circuit shown in FIG. 5, and finally transmitted to a 4-20 mA current output circuit shown in FIG. 7 through an amplifier circuit shown in FIG. 6 to output a speed current signal. A power supply is negatively connected to one end of a varistor and the other end of the varistor is connected to the housing as the anti-surge PTC to play a protective role.

The above is just the preferred implementation of an integrated acceleration, speed and vibration sensor. The protection scope of the integrated acceleration, speed and vibration sensor is not limited to the above example. All technical solutions under this idea belong to the protection scope of the disclosure. It should be noted that those skilled in the art can make several improvements and changes without departing from the principle of the disclosure, which, however, should also be regarded as being included in the protection scope of the disclosure.

What is claimed is:

1. A sensor, comprising a housing, a circuit board, and a base;
   wherein the housing is mounted on the base, the circuit board is mounted in the housing;
   wherein the circuit board comprises:
      an accelerometer configured to output a first signal representing acceleration of the accelerometer along a direction;
      a first positive phase proportional amplifier configured to output a second signal by amplifying the first signal;
      an integrator configured to output a third signal by integrating the first signal;
      a second positive phase proportional amplifier configured to output a fourth signal by amplifying the third signal;
      a low-pass filter configured to output a fifth signal by performing low-pass filtering on the fourth signal;
      an RMS-to-DC converter configured to output a sixth signal representing a root-mean-square (RMS) of the fifth signal;
      a third positive phase proportional amplifier configured to output a seventh signal by amplifying the sixth signal, wherein the seventh signal represents velocity of the accelerometer along the direction.

2. The sensor of claim 1, further comprising an anti-surge PTC.

3. The sensor of claim 2, wherein the anti-surge PTC comprises a varistor connected to the housing.

4. The sensor of claim 1, further comprising an aviation plug configured to connect to a power supply and signal line.

5. The sensor of claim 1, wherein the housing has a threaded hole.

* * * * *